J. EHLIN, DEC'D.
F. W. HINELINE, ADMINISTRATOR.
GEARING.
APPLICATION FILED APR. 30, 1915.
1,161,463.
Patented Nov. 23, 1915.
2 SHEETS—SHEET 1.
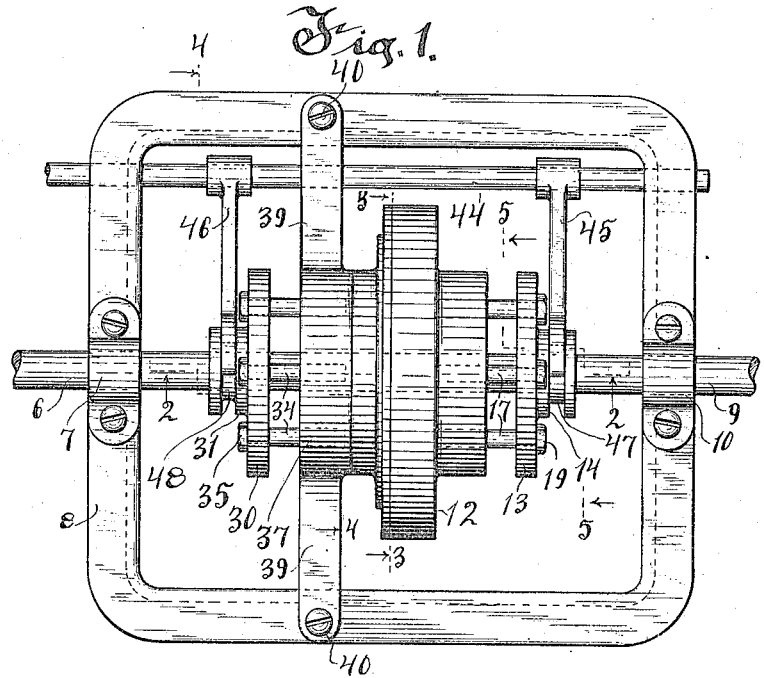
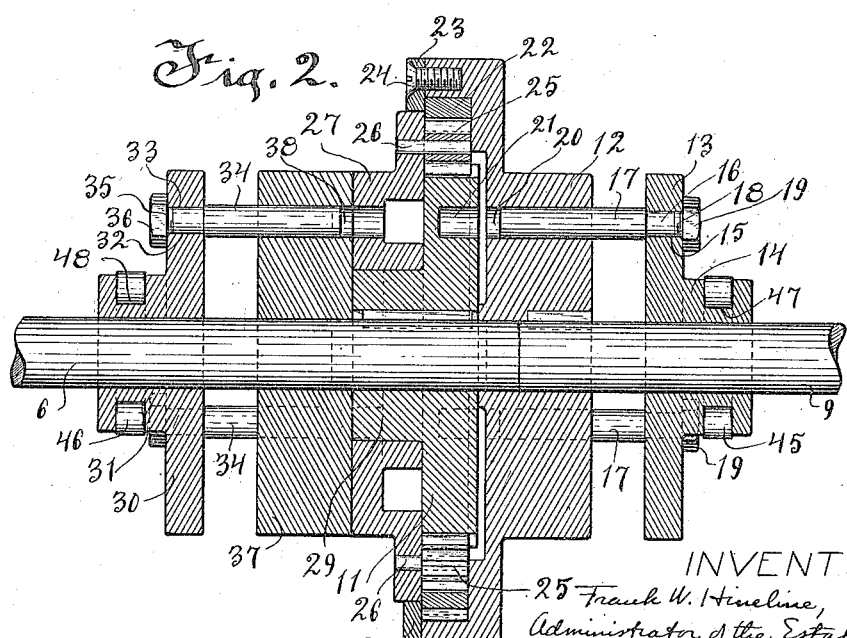

J. EHLIN, DEC'D.
F. W. HINELINE, ADMINISTRATOR.
GEARING.
APPLICATION FILED APR. 30, 1915.

1,161,463.

Patented Nov. 23, 1915.
2 SHEETS—SHEET 2.

INVENTOR
Frank W. Hineline, Administrator
of the Estate of John Ehlin, deceased.

Morsell, Keeney & French
ATTORNEYS

UNITED STATES PATENT OFFICE.

JOHN EHLIN, DECEASED, LATE OF CHICAGO, ILLINOIS, BY FRANK W. HINELINE, ADMINISTRATOR, OF CHICAGO, ILLINOIS, ASSIGNOR TO FRANK W. HINELINE, TRUSTEE, OF CHICAGO, ILLINOIS.

GEARING.

1,161,463. Specification of Letters Patent. Patented Nov. 23, 1915.

Application filed April 30, 1915. Serial No. 24,850.

*To all whom it may concern:*

Be it known that JOHN EHLIN, deceased, late a citizen of the United States and resident of Chicago, in the county of Cook and State of Illinois, invented new and useful Improvements in Gearing, of which the following is a description, reference being had to the accompanying drawings, which are a part of the specification.

The invention relates to gearing.

The invention designs more particularly to provide a connection between a drive shaft and a driven shaft whereby the rotation of the drive shaft will impart either direct or reverse motion to the driven shaft or the driven shaft may be rendered inoperative.

The invention designs to provide a connection between a drive shaft and driven shaft in axial alinement with each other, the parts of the connection being concentrically mounted upon said shafts and means for shifting the connecting elements to cause the drive shaft to impart direct or reverse rotation to the driven shaft and to maintain the driven shaft in neutral position.

A further object of this invention is to provide a connection of the character set forth which is of few parts and well adapted to accomplish the functions hereinafter described.

The invention consists in the several features hereinafter set forth and more particularly defined by claims at the conclusion hereof.

Figure 3:
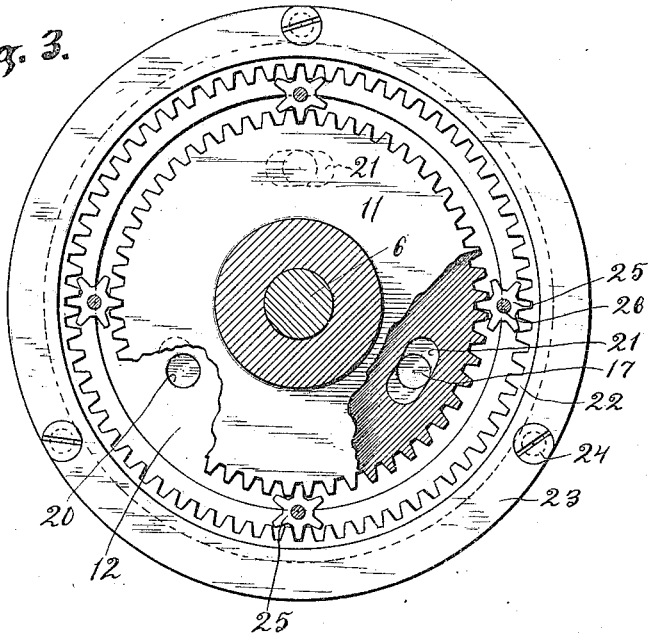
Figure 4:
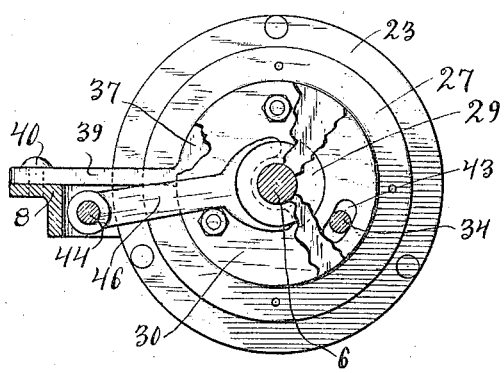
Figure 5:
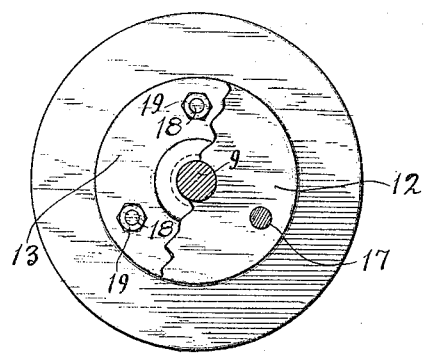

In the drawings, Figure 1 is a plan view of the device embodying the invention; Fig. 2 is a section taken on the line 2—2 of Fig. 1; Fig. 3 is a section taken on line 3—3 of Fig. 1; parts being broken away and parts being shown in section; Fig. 4 is a section taken on the line 4—4 of Fig. 1, parts being broken away; Fig. 5 is a section taken on line 5—5 of Fig. 1, parts being broken away.

The invention consists in a driving connection between a drive-shaft 6 mounted in a journal bearing 7 on a frame 8 and a driven shaft 9 mounted in a journal bearing 10 in the said frame 8, said two shafts abutting and in axial alinement with each other, said connection comprising means for connecting the driven shaft with the drive shaft for direct rotation, reverse rotation and for maintaining said driven shaft in inoperative or neutral position during the rotation of the drive shaft.

The connection comprises a gear 11 keyed to the drive shaft 6, a cup-shaped gear-carrying member 12, keyed to the driven shaft 9, means for locking said gear 11 and member 12 for direct drive of the shaft 9 from the shaft 6, a gearing connection between the gear 11 and the member 12, means for locking said gear 11 and member 12 through the gearing connection to reverse the drive of the driven shaft 9 from the drive shaft 6, means for shifting said gear locking means to accomplish the purposes above set forth and to maintain the locking means in neutral position to stop the rotation of the driven shaft 9 while the drive shaft 6 is running.

The means for locking the gear 11 to the member 12 for direct drive comprises a collar 13 whose hub portion 14 is slidably mounted upon the driven shaft 9 said collar having a plurality of apertures 15, preferably three, equidistant from each other and from the axis of the shaft 9 for receiving the reduced shanks 16 of locking pins 17 so that their axis are parallel to the axis of the shaft 9, the threaded ends 18 of said pins being provided with lock nuts 19 for rigidly securing said shanks to the collar 13 and means in said cup-shaped member 12 and said gear 11 for receiving said locking pins 17. This means comprises a plurality of apertures 20 in the cup-shaped member 12 which are always in register with the pins 17 and a plurality of arcuate slots 21 in the gear 11 equidistant from each other and from the axis of the shaft 9 and into which the pins 17 are brought by moving said collar 13 inwardly, by means hereinafter described. It will be noted that the member 12 is of such width that the greater portion of the length of the pins 17 are secured therein when they are about to be brought into engagement with the gear 11. This serves to relieve the pins themselves of lateral thrust and to transfer this thrust to the member 12.

The gearing connection between gear 11 and member 12 comprises an annular gear 22 mounted in the cup-shaped member 12 and keyed thereto and further secured in place by a ring 23 secured to said member 12 by screw bolts 24, a plurality of idler gears 25, preferably four, arranged at a quadrants distance in mesh with said gears 22 and 11, said idler gears 25 being revolubly mounted on pins 26 carried by an annular or ring member 27 revolubly mounted on a hub portion 29 of the gear 11.

The means for locking the gear 11 and member 12, through the gearing connection to reverse the drive of the driven shaft, comprises means for locking the annular member 27 against rotation so that the rotation of drive shaft 6 will, through the gear 11, idlers 25 and annular gear 22, drive the shaft 9 in the opposite direction to that of the shaft 6. This means for locking the annular member against rotation comprises a collar 30 whose hub portion 31 is slidably mounted upon the shaft 6, said collar having a plurality of apertures 32, preferably three, equidistant from each other and from the axis of the shaft 6 for receiving the reduced shanks 33 of locking pins 34 so that their axes are parallel to the axis of the shaft 6, the threaded ends 35 of said pins being provided with lock nuts 36 for rigidly securing said shanks to the collar 30. Means are provided for relieving said pins 34 of lateral thrust and means are provided in said annular member 27 for receiving said locking pins 34.

The means for relieving the pins 34 of lateral thrust comprises a bearing plate 37 having apertures 38 which are always in register with the pins 34, said bearing plate having extensions 39 which are secured by screw bolts 40 to the frame 8. In addition to the function above set forth this plate 37 serves as an additional bearing for the shaft 6.

The means in the annular member 27 for receiving the locking pins 34 comprises a plurality of arcuate slots 43 equidistant from each other and from the axis of the shaft 6 and whose axes are at the same distance from the shaft 6 as the pins 34 so they may be brought into locking engagement with the collar 30 by means hereinafter described.

The means for operating the collars 13 and 30 and the locking pins connected thereto comprises a longitudinally extending shaft 44 slidably mounted in bearings in the frame 8 and carrying forked arms 45 and 46 whose forked ends are seated in grooves 47 and 48 in the hubs of the collars 13 and 30 respectively. Consequently, the reciprocation of the shaft 44 will cause the simultaneous reciprocation of the collars 13 and 30 upon the shafts 9 and 6 respectively so that when the collar 13, carrying the pins 17, is moved inwardly in locking engagement with the gear 11, the collar 30, carrying the pins 34, is moved outwardly out of locking engagement with the ring 27 and the shaft may be moved half of its stroke to neutral position at which time neither collar is in locking engagement with the member connected to the shafts, as shown in Fig. 2.

The operation of the device is as follows:—To connect the shaft 9 to the shaft 6 for direct rotation therewith the shaft 44 is moved toward the left, moving the collars 13 and 30 upon the shafts 9 and 6 toward the left, moving the pins 17 into the apertures or slots 21 in the gear 11 and the pins 34 out of engagement with the gear 27. As a result, the pins 17, passing through both gear 11 on the shaft 6 and member 12 on the shaft 9, said members will rotate together. To stop rotation of the shaft 9, the lock-pin-carrying collars are brought into mid-position, as previously pointed out. To reverse the direction of rotation of the shaft 9 with respect to the shaft 6, the shaft 44 is moved toward the right, moving the collars 30 and 13 upon the shafts 6 and 9 toward the right, moving the pins 34 into the slots 43 in the ring 27 and the pins 17 out of the slots 21. As a result, the ring 27 being locked against rotation, the rotation of the shaft 6 will through the gear 11, idlers 25 and annular gear 22, reverse the rotation of the driven shaft 9.

The invention thus exemplifies a driving connection between a drive shaft and driven shaft in axial alinement with each other, the parts of said connection being mounted on said shafts and protected against lateral thrust, said connection permitting a direct or a reverse movement of the shaft 9 with respect to the shaft 6.

What is claimed as the invention is:—

1. The combination, with a drive-shaft and a driven shaft in axial alinement therewith, of a driving connection between said shafts comprising a sun-gear mounted on said drive-shaft, a gear-carrying member mounted on said driven-shaft adjacent said sun-gear, means slidably mounted on the driven shaft and movable to a position within said gear-carrying member and sun gear for positively locking said sun-gear and said member together for driving the driven-shaft in the same direction as that of the drive-shaft, an orbit gear carried by said member, and gearing carried by the sun gear adapted to be brought into driving relation with said sun-gear and orbit gear whereby the latter will be driven in a direction opposite to that of the former.

2. The combination, with a drive-shaft and a driven-shaft in axial alinement therewith, of a driving connection between said shafts comprising a sun-gear mounted on said drive-shaft, a gear-carrying member mounted on said driven-shaft adjacent said sun-gear, pins for positively locking said sun-gear and said member together for driving the driven-shaft in the same direction as that of the drive-shaft, an orbit gear carried by said member, a plurality of planetary gears in mesh with said sun and orbit gears and carried by said sun-gear, and means for connecting said planetary gears in driving relation with said sun and orbit gears to drive the driven shafts in a direction opposite to that of the drive-shaft.

3. The combination, with a drive-shaft and a driven-shaft in axial alinement therewith, of a driving connection between said shafts comprising a sun-gear mounted on said drive-shaft, a gear-carrying member mounted on said driven-shaft, slidable locking means mounted on the driven-shaft for positively connecting said sun-gear and said member to drive said shafts in the same direction, an orbit gear carried by said member, planetary gears carried by said sun-gear and in mesh with said sun and orbit gears, and locking means slidably mounted on the drive-shaft for positively connecting said planetary gears in driving relation with said sun and orbit gears to drive the driven-shaft in a direction opposite to that of the drive-shaft.

4. The combination, with a drive-shaft and a driven-shaft in axial alinement therewith, of a driving connection between said shafts comprising a sun gear mounted on said drive-shaft, a gear-carrying member mounted on said driven-shaft, locking pins slidably carried by said driven shaft and engaging said sun gear and said member to lock said shafts to drive in the same direction, an orbit gear carried by said member, planetary gears carried by said sun-gear and in mesh with said sun and orbit gears, and locking pins slidably carried by said drive-shaft simultaneously operable with said first named locking pins and adapted, when the first named locking pins are thrown out of operable connection, to connect said planetary gears in driving relation with said sun and orbit gears to drive the driven shaft in a direction opposite to that of the drive-shaft.

5. The combination, with a drive-shaft and a driven-shaft in axial alinement therewith, of a driving connection between said shafts comprising a gear-wheel fixed to said drive shaft, a gear-carrying member fixed to said driven shaft adjacent said gear-wheel, slidable means mounted on the driven shaft for operatively connecting said gear-wheel and said member to drive said shafts in the same direction, an internal gear carried by said member, a gearing connection between said first named gear-wheel and said internal gear and carried by said first named gear-wheel, and means mounted on the drive-shaft simultaneously slidable with said first named means and adapted, when the first named means are thrown out of operable connection, to connect said gearing connection in driving relation with said first named gear-wheel and said internal gear wheel to drive the driven-shaft in a direction opposite to that of the drive-shaft.

6. The combination, with a frame and a drive shaft and a driven-shaft in axial alinement with said drive-shaft journaled in said frame, of a bearing member for the drive-shaft having a plurality of apertures therein and secured to said frame, a sun-gear mounted on said drive-shaft adjacent said bearing member and having slots in one side, a gear-carrying member fixed to the driven-shaft and having a plurality of apertures therein, a collar slidably mounted on said driven-shaft and carrying a plurality of locking members adapted to pass through said apertures in the gear-carrying member and into the slots in the side of the sun-gear to lock said shafts to drive in the same direction, an orbit gear carried by said gear-carrying member, a gearing-connection between said sun gear and orbit gear comprising a member having slots on one side and revolubly mounted on said sun-gear, a collar slidably mounted on said drive-shaft and carrying a plurality of locking members adapted to enter the apertures in the bearing member and the slots in said gearing-connection member to lock said connection in driving relation with said sun-gear and orbit gear to drive the driven-shaft in a direction opposite to that of the drive-shaft, and means for simultaneously operating both of said collars for direct or reverse drive of said shaft.

7. The combination, with a drive-shaft and a driven-shaft in axial alinement therewith, of a driving connection between said shafts comprising a gear-wheel fixed to the drive shaft and having slots in one side, a gear-carrying member fixed to the driven-shaft and having a plurality of apertures therein, a collar slidably mounted on said driven-shaft and carrying a plurality of locking members adapted to pass through said apertures in the gear-carrying member and into the slots in the side of said gear-wheel to lock said shafts to drive in the same direction, an internal gear carried by said gear-carrying member, a gearing-connection between said first named gear-wheel and said internal gear-wheel comprising a member having slots on one side and carried by said first named gear-wheel, and a collar slidably mounted on said drive shaft and carrying a plurality of locking members adapted to enter the slots in said gearing connection member to lock said connection in driving relation with said first named gear-wheel and said internal gear to drive the driven-shaft in a direction opposite to that of the drive-shaft.

In testimony whereof, I affix my signature.

FRANK W. HINELINE,
*Administrator of the estate of John Ehlin, deceased.*

Copies of this patent may be obtained for five cents each, by addressing the "Commissioner of Patents, Washington, D. C."